United States Patent Office 3,306,899
Patented Feb. 28, 1967

3,306,899
4-AMINO-2-HALO AND ALKYL-4,5-DIHYDROFU-RANS AND PROCESS FOR THEIR PREPARATION
Rostyslaw Dowbenko, Gibsonia, Pa., assignor to Pittsburgh Plate Glass Company, Pittsburgh, Pa., a corporation of Pennsylvania
No Drawing. Filed July 8, 1964, Ser. No. 381,241
13 Claims. (Cl. 260—247.7)

This invention relates to derivatives of halogen-substituted amino alcohols and their method of preparation. More particularly, the invention relates to the reaction of 2-amino-4-halo-3-buten-1-ols with a base and to the aminodihydrofurans which are the products of this invention.

The compounds which are the products of this invention correspond to the formula:

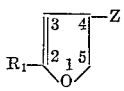

where $R_1$ is halogen, i.e., chlorine, bromine or fluorine and a lower alkyl radical containing 1 to 10 carbon atoms and where Z is a secondary or tertiary amino group.

The halogen-substituted amino alcohols which constitute the starting material for the process of this invention correspond to the formula:

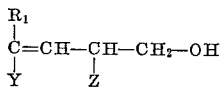

where Y is chlorine or bromine, $R_1$ is lower alkyl, chlorine, bromine or fluorine, and Z is a secondary or tertiary amino group, that is, where Z is a radical derived by removing a hydrogen atom from the amine nitrogen atom of an amine, said amine nitrogen atom having from 1 to 2 carbon to nitrogen bonds and from 1 to 2 nitrogen to hydrogen bonds. Preferably, the amino group is a tertiary amino group, and more preferably, the amino group is a heterocyclic tertiary amino group. Preferably, the amino groups contain a total of 20 carbon atoms or less. Examples of such amino groups include secondary alkylamino groups such as ethylamino, butylamino, hexylamino and the like. Specific examples include:

2-butylamino-4,4-dichloro-3-buten-1-ol
2-isopropylamino-4,4-dichloro-3-buten-1-ol Examples of tertiary amino groups include dialkylamino groups such as diethylamino, di-n-propylamino, diisobutylamino and dihexylamino groups. Specific examples of such compounds include:

2-dibutylamino-4,4-dichloro-3-buten-1-ol
2-diisopropylamino-4,4-dichloro-3-buten-1-ol The tertiary amino groups do not necessarily have to contain two identical substituents. Examples of such mixed amino groups include N-methylethylamine, N-ethylhexylamine, and the like. The preferred amino groups are those derived from a heterocyclic amine. Examples of such heterocyclic amino groups include morpholino, piperidino, pyrrolidino, N-methylpiperazino, hexamethylene imino, and thiomorpholino. As may be seen from the above, the heterocyclic amino group may contain additional hetero atoms, for example, nitrogen, oxygen or sulfur. Specific examples of these compounds include:

2-morpholino-4,4-dichloro-3-buten-1-ol
2-piperidino-4,4-dichloro-3-buten-1-ol
2-(N-methylpiperazino)-4,4-dichloro-3-buten-1-ol
2-morpholino-4-methyl-4-chloro-3-buten-1-ol
2-morpholino-4,4-dibromo-3-buten-1-ol
2-morpholino-4-fluoro-4-chloro-3-buten-1-ol A method of preparing the above 2-amino-4-halo-3-buten-1-ols is disclosed in copending application, Serial No. 305,202, filed August 28, 1963.

The base employed in the process of the instant invention is an alkali metal hydroxide such as sodium hydroxide, potassium hydroxide or lithium hydroxide. Preferably, the base is sodium or potassium hydroxide.

The hydroxide is usually employed as an aqueous solution. However, a solution of the hydroxide in a lower aliphatic alcohol such as methanol, ethanol, or butanol may be employed. Likewise, while the use of a solution of the base is preferred, the reaction may be conducted in the presence of finely divided alkali metal hydroxide dispersed in the reaction medium. However, the use of this procedure results in lower conversion to the desired product and also extends the reaction time.

The proportions of reactants utilized may also be varied widely. However, since a mole of alkali metal halide, alkali metal-Y, is eliminated during the reaction for each mole of the product, at least one mole of alkali metal hydroxide must be employed per mole of the halogen-substituted amino alcohol sought to be converted. The reaction is preferably carried out in the presence of a substantial excess of the base, usually about 2 moles or more of the base per mole of the halo-substituted amino alcohol present.

The reaction conditions employed to produce the products of this invention may vary widely. For example, the reaction may be carried out at room temperature. However, somewhat elevated temperatures are usually employed in order to obtain industrially practical reaction times. Usually the reaction is conducted between about 60° C. and 150° C. or higher. Preferably, the reaction is conducted between about 75° C. and 125° C.

The compounds of this invention may be recovered from the reaction mixture by conventional techniques known to the organic chemist. Usually the reaction yields a mixture of the desired product, an alkali metal salt and excess alkali metal hydroxide. The usual technique comprises adding a suitable solvent for the product such as an ether and washing with water to remove the salt and free base, the solvent phase is then worked up removing the solvent and allowing the product to crystallize. Where an oil results, the product may be separated by distillation under reduced pressure. The resultant product may be further purified by repeated distillation and/or crystallization. An alternative method of separating the desired product is by steam distilling of the reaction medium.

There is set forth below an example which illustrates the method of producing the compounds of this invention. This example is, of course, given by way of illustration only and should not be construed as limiting the invention to the particular details thereof. All parts and percentages set forth as true throughout this specification are by weight unless otherwise specified.

EXAMPLE I

[Reaction of 2-morpholino-4,4-dichloro-3-buten-1-ol and sodium hydroxide; 2-chloro-4-morpholino-4,5-dihydrofuran]

A mixture of 22.6 grams (0.10 mole) of the 2-morpholino-4,4-dichloro-3-buten-1-ol and a solution of 8.0 grams (0.20 mole) of sodium hydroxide in 50 milliliters of water was refluxed for 10 hours, then cooled. The reaction mixture was extracted with ether, the extract was washed with water and dried. Removal of the solvent and distillation of the residue gave 14.0 grams (74 percent) of 2-chloro-4-morpholino-4,5-dihydrofuran, boiling point 81° C. at 0.1 millimeter of mercury, $n_D^{25}$ 1.5071, transparent from 2.5 microns to 3.3 microns and showing complex absorption at 3.3 microns to 3.8 microns and a strong band at 6.13 microns in the infrared. It was homogeneous in gas chromatography. The product was analyzed.

Analysis for $C_8H_{12}ClNO_2$—

Calculated (percent): Carbon, 50.66; hydrogen, 6.38; nitrogen, 7.39; chlorine, 18.70. Found (percent): Carbon, 49.87; hydrogen, 6.26; nitrogen, 7.24; chlorine, 18.78.

The utility of the compounds of the instant invention is varied. For example, the instant compounds contain an amino group and accordingly find utility as neutralizing agents for acids such as hydrochloric acid. Likewise, these compounds, since they contain a reactive amine group and a double bond, are useful as precursors for more complex molecules. Further, the compounds of this invention may also be utilized as a catalyst for the polyisocyanate-polyol reaction to produce polyurethane coatings, castings or foams.

Although specific examples of the invention have been set forth hereinabove, it is not intended that the invention be limited solely thereto, but to include all of the variations and modifications falling within the scope of the claims.

I claim:

1. A compound corresponding to the formula:

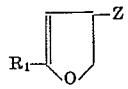

where $R_1$ is selected from the group consisting of chlorine, bromine, fluorine and lower alkyl radicals having 1 to 10 carbon atoms, and where Z is an amino group selected from the group consisting of heterocyclic amino groups selected from the group consisting of morpholino, piperidino, pyrrolidino, N-methyl-piperizino, hexamethylene imino, and thiomorpholino, monoalkylamino groups and dialkylamino groups having 1 to 20 carbon atoms.

2. A compound as in claim 1 where Z is a heterocyclic amino group.

3. A compound as in claim 1 where Z is a dialkylamino group.

4. A compound as in claim 1 where Z is a monoalkylamino group.

5. A compound as in claim 2 where $R_1$ is chlorine.

6. A compound as in claim 2 where Z is morpholino.

7. A compound as in claim 2 where Z is piperidino.

8. A compound as in claim 2 where Z is N-methyl-piperazino.

9. 2-chloro-4-morpholino-4,5-dihydrofuran.

10. A process for preparing an aminodihydrofuran which comprises reacting a 2-amino-4-halo-3-buten-1-ol corresponding to the formula:

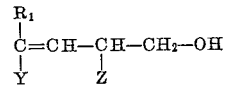

where Y is selected from the group consisting of chlorine or bromine, $R_1$ is selected from the group consisting of lower alkyl having 1 to 10 carbon atoms, chlorine, bromine and fluorine, and Z is a secondary or tertiary amino group selected from the group consisting of heterocyclic amino groups selected from the group consisting of morpholino, piperidino, pyrrolidino, N-methyl-piperizino, hexamethylene imino and thiomorpholino, dialkylamino groups and monoalkylamino groups having 1 to 20 carbon atoms, in the presence of at least about one mole per mole of the 2-amino-4-halo-3-buten-1-ol of an alkali metal hydroxide.

11. A process as in claim 10 where the alkali metal hydroxide is present in the form of a solution in a solvent selected from the group consisting of water and lower alkanols.

12. A process as in claim 11 where the alkali metal hydroxide is selected from the group consisting of sodium hydroxide and potassium hydroxide and where the reaction is conducted at a temperature between about 75° C. to about 125° C.

13. A process as in claim 11 where the 2-amino-4-halo-3-buten-1-ol is 2-morpholino-4,4-dichloro-3-buten-1-ol.

No references cited.

ALEX MAZEL, *Primary Examiner.*

JOSE TOVAR, *Assistant Examiner.*